UNITED STATES PATENT OFFICE.

CHARLES F. BURGESS, OF MADISON, WISCONSIN, ASSIGNOR TO BURGESS BATTERY COMPANY, OF MADISON, WISCONSIN, A CORPORATION OF WISCONSIN.

MANUFACTURE OF DRY CELLS.

1,305,250.   Specification of Letters Patent.   Patented June 3, 1919.

No Drawing.   Application filed October 20, 1917.   Serial No. 197,553.

*To all whom it may concern:*

Be it known that I, CHARLES F. BURGESS, a citizen of the United States, residing at Madison, in the county of Dane, State of Wisconsin, have invented certain new and useful Improvements in the Manufacture of Dry Cells, (Case I;) and I do hereby declare the following to be a full, clear, and exact description of the invention, such as will enable others skilled in the art to which it appertains to make and use the same.

The present invention relates to Leclanché cells of the type commonly designated as "dry cells". It is a common practice to employ manganese dioxid as one of the important ingredients of these cells, this material, often designated merely as "manganese", being mixed with powdered graphite, carbon or the like, to serve as an envelop for the carbon electrode of the cell, and yielding oxygen to lessen polarization. The material which has been the standard for this work has been the high grade pyrolusite ore obtained from Russia and analyzing about 85% $MnO_2$, and less than 1% of iron, and before using has usually been ground to a 20-mesh size or finer.

I have found that the ampere hour capacity of a dry cell is dependent not only on the percentage of $MnO_2$ in the depolarizing material, but also upon the physical condition of this material. A hard, dense ore gives less satisfactory results than a softer, porous material of the same fineness and percentage of $MnO_2$, and I have discovered a way of treating manganese oxid ores, preparatory to use in dry cells, whereby their efficiency as a dry cell material is very much increased and whereby even hard, dense ores are made to give results as good or even better than the softer material heretofore obtainable.

The process of my present invention comprises a roasting of the manganese oxid ore to convert some of its manganese dioxid to a lower oxid, and then treating with a suitable solvent to dissolve out said lower oxid and leave a porous residue of relatively pure manganese dioxid. The roasting operation may be carried out as a step preliminary to the removal of various impurities, such as arsenic, antimony, nickel, chromium, cobalt and copper, as described and claimed in my companion application, Serial No. 197,554 filed October 20, 1917, or may be carried out solely for the purpose of rendering the manganese dioxid more porous and thereby more efficient.

I prefer to roast for about one to four hours at a temperature of about 600° C., as I have found that this converts sufficient of the $MnO_2$ to a lower oxid. The ore may be ground to a size of 20-mesh or finer, either before or after roasting.

The treatment for removal of the lower oxid may be effected with an aqueous solution and preferably is effected with a dilute mineral acid, such as a 10% sulfuric acid or an equivalent solution of niter cake ($NaHSO_4$) or a 5% hydrochloric acid. The lower oxids of manganese are more soluble than manganese dioxid and so pass into solution as chlorids, if hydrochloric acid is used, or as sulfates, if sulfuric acid or niter cake is used, so that on washing and drying the residue, there is obtained a relatively pure or high grade manganese dioxid. Various impurities, such as arsenic, antimony, nickel chromium, cobalt and copper, may likewise be removed by a solvent, and their removal increases the porosity of the residue and at the same time improves its quality.

Under high magnification the individual grains of the residue are highly porous, somewhat like pumice stone or sponges, and each grain presents an enormous total area exposed to the action of the electrolyte and other ingredients of the dry cell.

When using a mineral acid solution as above mentioned for this treatment, I find that purification is substantially complete with dense 20-mesh material after agitation with the solvent for one to eight hours. This treatment can be carried on at room temperature or can be hastened by heating.

In making dry cells out of manganese oxid ore rendered porous by roasting and subsequent acid treatment, I proceed according to well known methods, mixing the manganese dioxid with carbonaceous material, such as graphite or a mixture of graphite and carbon together with an electrolyte of sal-ammoniac-zinc chlorid, and assembling the materials between the electrodes of the cell in well known manner. By this process, the hard, dense ores may be utilized with results equal to and, in some instances, superior to those obtainable with softer grades.

I claim:

1. The method which consists in roasting a manganese oxid ore to convert some of its manganese dioxid to a lower oxid, dissolving out said lower oxid to leave a porous residue of relatively pure manganese dioxid, and intimately mixing said residue with a suitable carbonaceous material to form a depolarizing mix suitable for use in dry cells.

2. The method which consists in roasting a dense manganese oxid ore at a temperature of about 600° C. for about one to four hours to convert some of its manganese dioxid to a lower oxid, dissolving out said lower oxid to leave a porous residue of relatively pure manganese dioxid and intimately mixing said residue with a suitable carbonaceous material to form a depolarizing mix suitable for use in dry cells.

3. The method which consists in roasting a manganese oxid ore to convert some of its manganese dioxid to a lower oxid, treating the roasted ore with a dilute mineral acid to dissolve out said lower oxid and leave a porous residue of relatively pure manganese dioxid and intimately mixing said residue with a suitable carbonaceous material to form a depolarizing mix suitable for use in dry cells.

4. A depolarizing mix for dry cells, comprising a carbonaceous material intimately associated with manganese dioxid rendered porous by dissolving out a lower oxid formed therein by preliminary roasting.

5. A depolarizing mix for dry cells comprising a carbonaceous material intimately associated with manganese dioxid rendered porous by dissolving out with a dilute mineral acid a lower oxid formed therein by preliminary roasting to about 600° C.

In testimony whereof I affix my signature.

CHARLES F. BURGESS.